Oct. 28, 1952      E. E. COFFIN      2,615,372
MILLING MACHINE SPINDLE AXIAL SHIFT CONTROL
Filed March 2, 1948      10 Sheets-Sheet 1

Fig.1

Inventor:
Edward E. Coffin
by: Maxwell Fish
Attorney

Oct. 28, 1952 E. E. COFFIN 2,615,372
MILLING MACHINE SPINDLE AXIAL SHIFT CONTROL
Filed March 2, 1948 10 Sheets-Sheet 2

Fig. 2

Inventor:
Edward E. Coffin
by: Maxwell Finn
Attorney

Oct. 28, 1952     E. E. COFFIN     2,615,372
MILLING MACHINE SPINDLE AXIAL SHIFT CONTROL
Filed March 2, 1948     10 Sheets—Sheet 3

Fig. 3

Inventor:
Edward E. Coffin
by: Maxwell Fish
Attorney

Oct. 28, 1952 E. E. COFFIN 2,615,372
MILLING MACHINE SPINDLE AXIAL SHIFT CONTROL
Filed March 2, 1948 10 Sheets-Sheet 4

Fig. 4

Inventor:
Edward E. Coffin
by: Maxwell Fish
Attorney

Fig. 5

Oct. 28, 1952 E. E. COFFIN 2,615,372
MILLING MACHINE SPINDLE AXIAL SHIFT CONTROL
Filed March 2, 1948 10 Sheets-Sheet 6

Fig. 6

Inventor:
Edward E. Coffin
by: Maxwell Fish
Attorney

Oct. 28, 1952 E. E. COFFIN 2,615,372
MILLING MACHINE SPINDLE AXIAL SHIFT CONTROL
Filed March 2, 1948 10 Sheets-Sheet 7

Fig. 7

Inventor:
Edward E. Coffin
by: Maxwell Fish
Attorney

Oct. 28, 1952 E. E. COFFIN 2,615,372
MILLING MACHINE SPINDLE AXIAL SHIFT CONTROL
Filed March 2, 1948 10 Sheets-Sheet 8

Fig. 8

Inventor:
Edward E. Coffin
by: Maxwell Fish
Attorney

Oct. 28, 1952     E. E. COFFIN     2,615,372
MILLING MACHINE SPINDLE AXIAL SHIFT CONTROL
Filed March 2, 1948     10 Sheets-Sheet 10

*Fig. 10*

Relationship Between Coils and Contacts on Relays and Contactors Shown in Fig. 9

Inventor
Edward E. Coffin
by Maxwell Fish
Att'y.

Patented Oct. 28, 1952

2,615,372

UNITED STATES PATENT OFFICE 2,615,372

MILLING MACHINE SPINDLE AXIAL SHIFT CONTROL

Edward E. Coffin, Providence, R. I., assignor to Brown and Sharpe Manufacturing Company, a corporation of Rhode Island Application March 2, 1948, Serial No. 12,653

20 Claims. (Cl. 90—16)

The present invention relates to improvements in machine tools, and more particularly to a control device adapted for controlling the position axially of a milling cutter spindle and its axially shiftable supporting sleeve.

The invention is herein disclosed in a preferred form as embodied in a horizontal-type milling machine which may be similar to that illustrated in U. S. Letters Patent to Bennett and Krause No. 2,068,840, dated January 26, 1937, for Improvements in Milling Machines. The machine referred to, is provided with a longitudinally moving work table, a spindle support, and a milling cutter spindle disposed to rotate on a horizontal axis transverse to the direction of table movement within a spindle sleeve which is mounted on the spindle support to permit a limited axial adjustment of the sleeve and spindle relative to the table. For effecting such axial adjustment, there is provided a manually operable racking control and a manually operable clamping device which serves to rigidly clamp the spindle sleeve in its adjusted position. In the machine referred to, adjustment of the spindle axially and the clamping of the spindle in adjusted position are effected by separate rotatable control knobs located at one side of the spindle head. An axial adjustment of the spindle when made by manipulation of the manual controls referred to, would normally be maintained during the entire operation upon one or more work pieces as, for example, during the continuance of an automatic operation in which the table and work supported thereon are fed at a feed rate past the milling cutter for the performance of a milling cut thereon, and are then returned at a rapid traverse rate in the reverse direction to the starting position for the removal of the work and the substitution of a new work piece in operating position on the table.

In the performance of face milling operations in which a face milling cutter is moved at a predetermined depth across the face of the work piece and is then returned at a rapid traverse rate in the reverse direction to the starting position in brushing contact with the previously milled surface of the work piece, it has been found, particularly where high speed cutters having hardened edges of cemented carbide are employed, that there is a tendency for the cutting surface to be chipped or otherwise marred by the light frictional contact with the work which takes place during the return movement.

It is a principal object of the invention to provide a control device which may be employed in connection with a face milling operation of this general description, and is well adapted to operate automatically to cause the milling cutter spindle to be advanced and clamped in its operating position just prior to the start of the cutting operation, and thereafter to be unclamped and retracted slightly from the work prior to the return movement of the table to its starting position upon completion of the face milling cut.

More specifically, it is an object of the invention to provide a simple and effective control device which is well adapted for use in a milling machine of the class described, having separate milling cutter spindle axial adjustment and clamping controls for effecting in sequence the advance of the cutter spindle to a predetermined operative position, and the clamping of the spindle, and in a second sequence the unclamping and retracting of the spindle from said operative position.

The control device provided in accordance with the invention, consists generally of a housing within which is mounted an air-operated piston unit and a system of racks and intermittent gears which are rendered operative by movement of the piston unit in one direction first to rotate the spindle racking shaft to a predetermined angular position in which the spindle is advanced to its operative position, and thereafter to actuate the clamp tightening element which is then held in its tightened position against the pressure exerted by the compressed air actuated piston unit. Movement of the piston unit in the reverse direction is operative through the operation of the racks and intermittent gears referred to, first to rotate the clamping element in a reverse direction to release the clamp, and thereafter to rotate the racking element so that the spindle sleeve, spindle mounted therein and face milling cutter are retracted slightly to the inoperative position.

In the preferred form of the invention shown, one of the intermittent gears is connected to the spindle racking shaft by means of a friction clutch which is releasable to permit a manual adjustment in the position of the racking shaft with relation to the intermittent gear, and thus to effect an adjustment of the advanced operating position to which the spindle sleeve and spindle supported therein will be advanced by the operation of the control device.

Further in accordance with the invention, the piston operated racks and gears and the elements of the spindle clamp are so constructed and related to one another as to cause the piston unit to continue its downward movement until arrested by the resistance of the screw-threaded clamping element as it is tightened to clamp the work and an adjustment is provided in the clamp actuating connections to cause the tightening of the clamp to take place before the piston unit reaches the limit of its downward movement.

With the above noted and other objects in view, as may hereinafter appear, the several features of the invention consist also in the devices, combinations and arrangement of parts hereinafter described and claimed, which together with the advantages to be obtained thereby will be readily understood by one skilled in the art from the following description taken in connection with the accompanying drawings, in which

Figure 1:
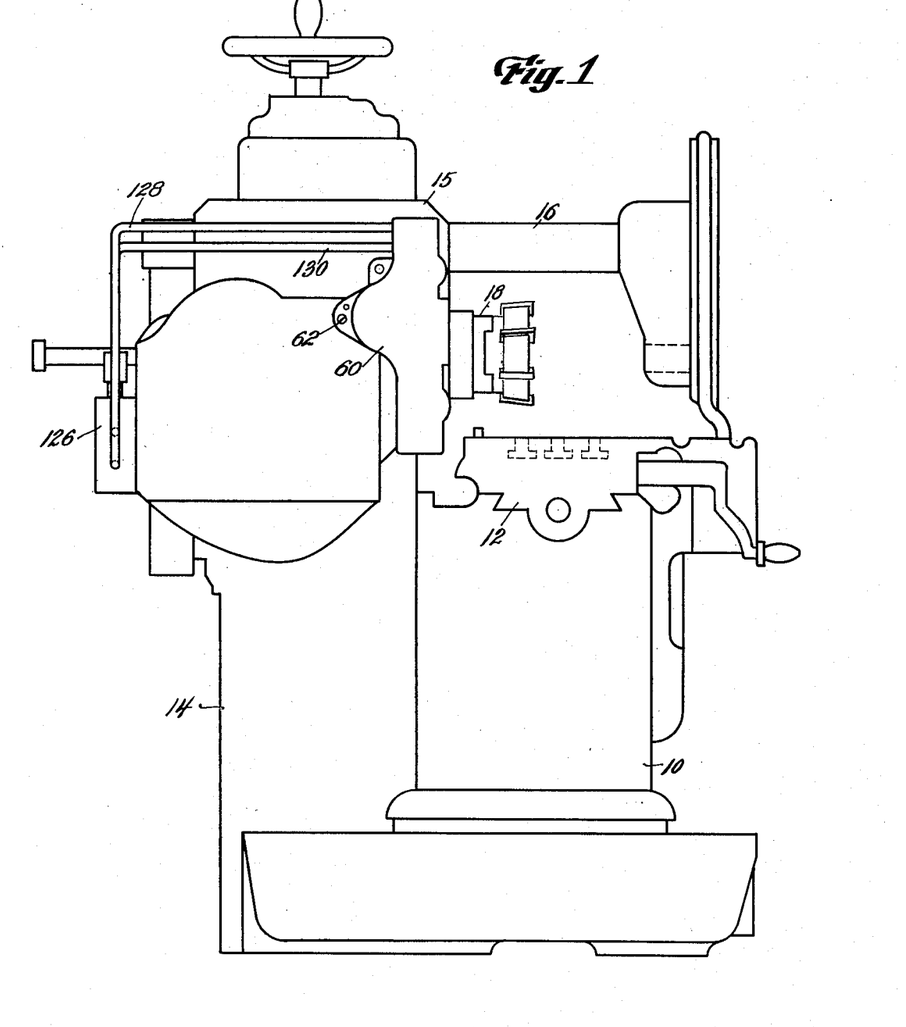
Fig. 1 is a somewhat diagrammatic view in left side elevation of a milling machine, illustrating particularly the application of my spindle retracting device including the air-control valve thereto.
Figure 3:
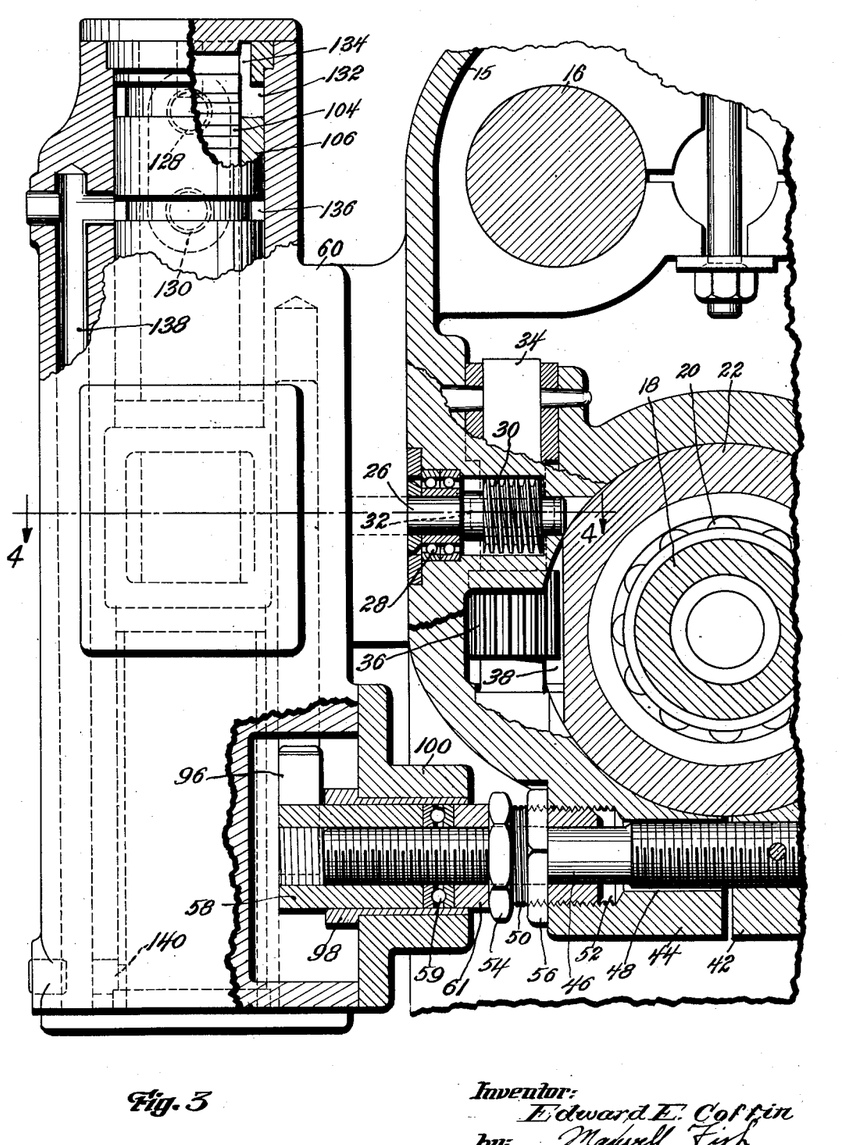
Fig. 3 is a detail sectional view on an enlarged scale, illustrating particularly the mechanisms for axially shifting and for clamping the supporting sleeve for the milling cutter spindle, and my spindle retracting attachment associated therewith, a portion of the attachment housing having been broken away and sectioned to show underlying parts.

Referring specifically to the drawings, the invention is particularly illustrated and described as embodied in a milling machine which may be substantially similar to that illustrated in the prior patent to Bennett and Krause above referred to, and shown in somewhat diagrammatic form in Fig. 1. The machine consists of a base 10 having mounted thereon a longitudinally movable work support 12, a machine column 14, a milling cutter spindle casing 15 provided with the usual forwardly extending supporting arms 16, and a horizontally disposed milling cutter spindle 18. The cutter spindle 18 as best shown in Fig. 3, is rotatably supported in anti-friction bearings such as that indicated at 20 within an axially shiftable spindle supporting sleeve 22 carried in the casing 15. For controlling the position of the spindle supporting sleeve, a rack and pinion operating connection is provided, together with a split clamping device for securing the sleeve in its adjusted position. These mechanisms, while well known in the art, will be hereinafter more fully described in connection with the description of my novel spindle control device.

The mechanism for shifting the spindle sleeve 22 axially, consists of a horizontally disposed operating shaft 26 which extends outwardly through the side of the milling cutter spindle casing 15, (see Fig. 3), and is supported within the casing in an anti-friction bearing 28. At its inner end the shaft 26 has formed thereon a worm 30 which meshes with a worm gear 32 as indicated in dotted lines in Fig. 3, on a vertical shaft 34. A pinion 36 on the shaft 34 meshes with a rack 38 cut in the side of the spindle sleeve 22.

The mechanism for clamping the spindle sleeve 22 in adjusted position, takes the form of a split clamp consisting of split clamping elements 42, 44 (see Fig. 3) formed in the casing 15 for gripping engagement with the forward end of the supporting sleeve 22. The connections for applying the clamp consist of a shaft 46 which is fixedly mounted at its right hand end in the clamping member 42 passing freely through an oversize axial bore 48 in the clamping member 44. The opposing element of the clamp consists of a sleeve element 50 which is loosely sleeved on shaft 46 and is externally threaded for engagement with corresponding threads formed in an enlarged portion 52 of the bore 48 in the clamping member 44. The sleeve member 50 is formed with a hexagonal head 54 for convenience of adjustment, and is held in adjusted position by means of a locking nut 56. The shaft 46 at its outer end is screw-threaded to receive an internally threaded sleeve member 58 which serves as an actuating or tightening element for the clamp. Rotation of the tightening element 58 to move said element inwardly on shaft 46, acts through an end thrust bearing 59 and spacer member 61 against the adjustable clamping member 50 to draw the shaft 46 to the left through the sleeve member 50 and thereby to relatively tighten the clamping members 42, 44.

In accordance with the present invention, a control mechanism is provided which acts automatically to operate the spindle racking shaft 26 and the clamp tightening element 58 in timed sequence to one another to advance, and thereafter to clamp, the spindle sleeve 22 and spindle 18 mounted therein in operating position, and alternatively to release the clamp and to retract the sleeve 22 and spindle 18. The control mechanism as shown in the drawings, takes the form of a housing 60 attached to the spindle head casing by means of bolts such as that indicated at 62 in Figs. 1, 4 and 5.

Figure 4:
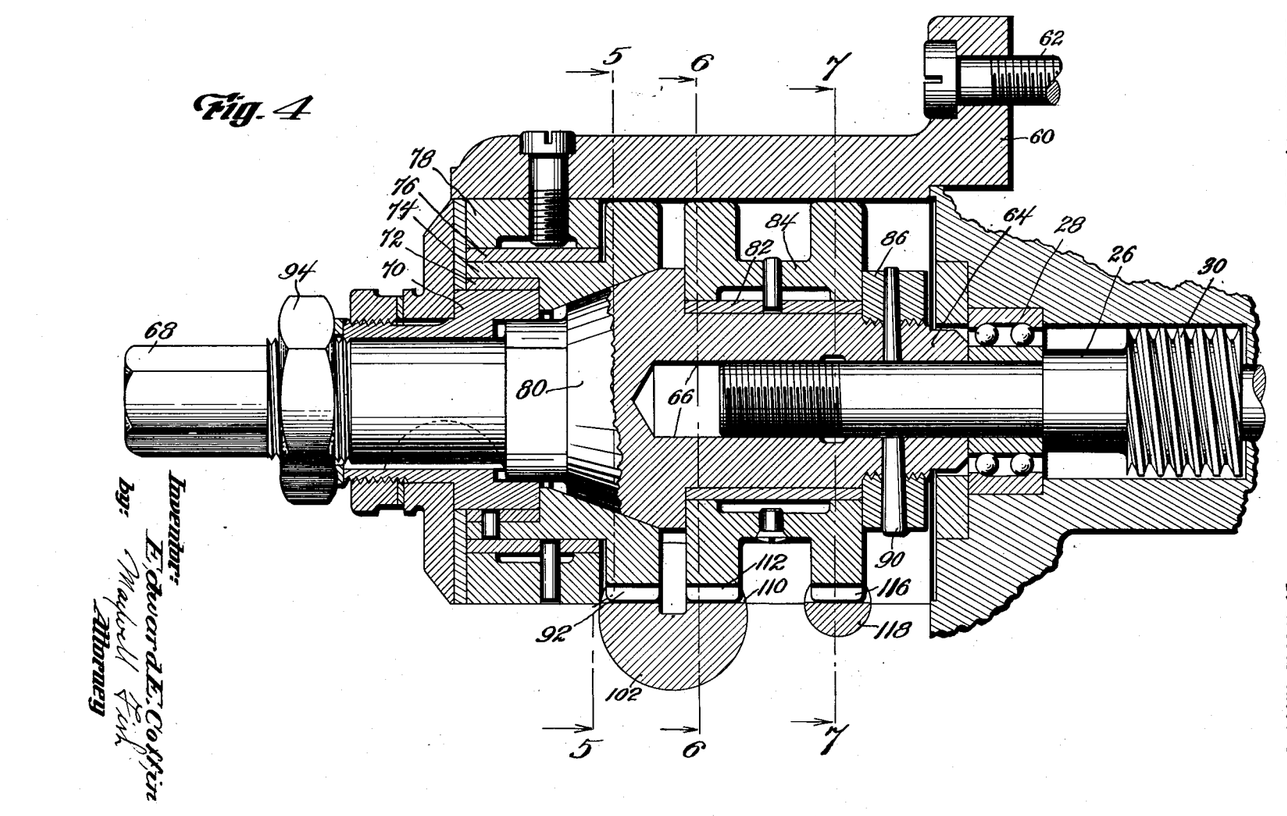
Fig. 4 is a sectional plan view on an enlarged scale taken on the line 4—4 of Fig. 3, illustrating particularly the piston-actuated rack, intermittent gears associated therewith, and the clutch connecting one of the intermittent gears with the spindle racking mechanism.

The spindle racking shaft 26 is arranged to extend within the housing 60 and has fitted thereto a shaft extension 64 formed with an internal bore 66 to receive the end of shaft 26 (see Fig. 4). The shaft extension 64 projects leftwardly through the side of the casing 60, and is provided at its outer end with a hexagonal end 68 which may be employed for manual adjustment of the forward or operating position of the milling cutter spindle as hereinafter more fully set forth. The shaft extension 64 is supported adjacent its outer end within a sleeve member 70 which is externally supported by a bushing 72 supported against the inner periphery of a clutch member 74. A bushing 76 and a supporting ring 78 therefor mounted within the housing 60 in turn provide external bearing support for the clutch member 74. The shaft extension 64 is formed with a tapered clutch surface 80 which is normally in clutching engagement with a corresponding tapered surface of clutch member 74. The shaft extension 64 provides support also for a bushing 82 and a sleeve gear unit 84 which is freely rotatable on shaft extension 64. The sleeve gear unit 84 is supported against axial movement between a shoulder formed adjacent the clutch face 80 and an annular ring 86 screw-threaded to the shaft extension 64. A tapered pin 90 serves to lock the ring 86, shaft extension 64 and spindle racking shaft 26 together to turn as a unit.

The clutch member 74 is normally held in frictional driving engagement with the clutch surface 80 by means of a hexagonal nut 94 screw-threaded to the shaft extension 64 adjacent its outer end. The nut 94 when tightened, acts against the sleeve member 70 and associated parts including the clutch member 74 to force the clutch member into a tight frictional engagement with the clutch surface 80. In order to effect a manual adjustment of the position of the racking shaft 26 and associated parts with relation to the clutch member 74, the nut 94 is backed off to release the clutch, and a suitable tool is then applied to the manual control end 68 to rotate the shaft extension 64 and shaft 26 with relation to the driving clutch element 74.

Figure 7:
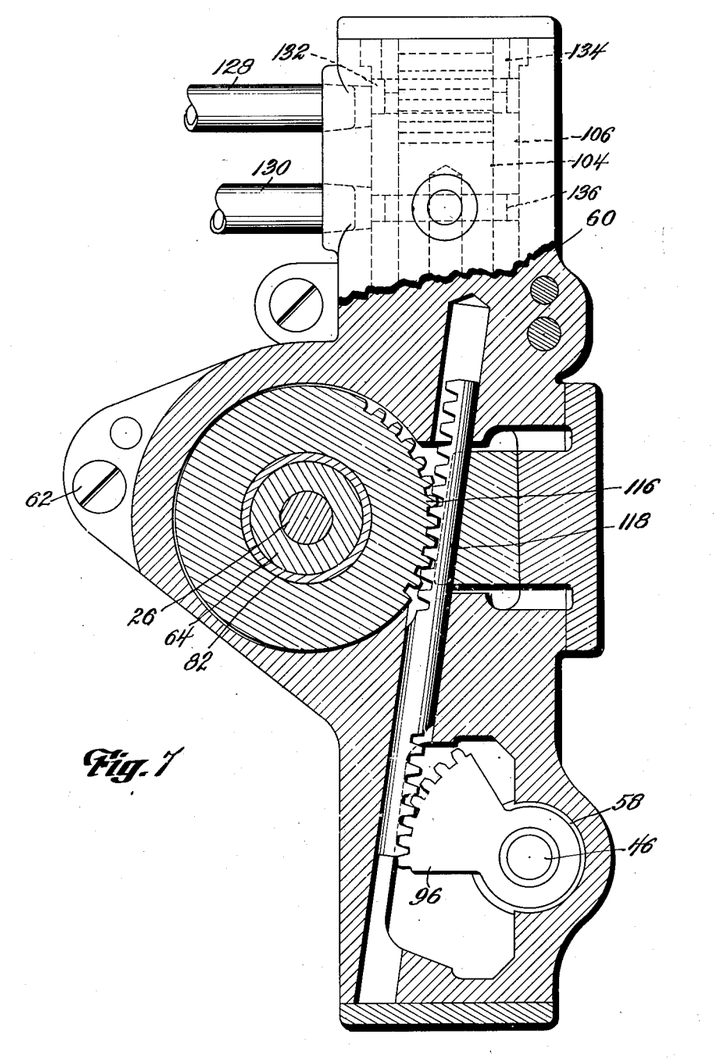
Fig. 7 is a section view in left side elevation taken on the line 7—7 of Fig. 4, illustrating the rack and pinion connections from the clamp actuating intermittent gear with the spindle sleeve clamping device.

The shaft 46 and clamping sleeve 58 screw-threaded thereto, for clamping the spindle in its adjusted position, are also arranged to extend within the housing 60 as best shown in Figs. 3 and 7, and the threaded sleeve clamping member 58 is formed with a gear segment 96 through which rotation of the threaded clamping sleeve is effected. The threaded sleeve member 58 and shaft 46 are externally supported in the casing 60 within a bushing 98 carried in a bearing support 100 formed in the casing 60 (Fig. 3).

Figure 5:
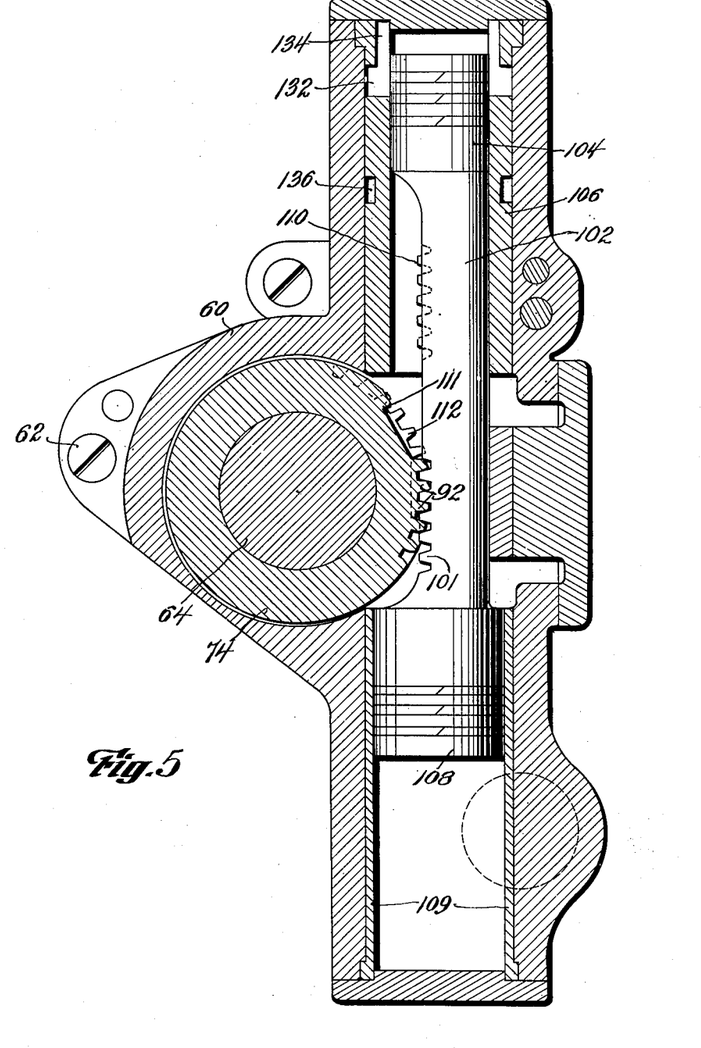
Fig. 5 is a sectional view in left side elevation taken on the line 5—5 of Fig. 4, illustrating particularly the piston-actuated rack and the spindle sleeve axial shift intermittent gear associated therewith.

Rotation of the actuating shaft assembly including shaft 26, shaft extension 64 and clutch member 74 to advance and retract the spindle sleeve is effected by means of a piston actuated rack member 102 having a toothed segment 101 which is adapted to mesh with the toothed segment of an intermittent gear 92 formed on the clutch member 74 as best shown in Fig. 5. The rack 102 is vertically disposed within the housing 60, and is formed at its upper end with a piston 104 slidably supported within a sleeve bushing 106, and is formed at its lower end with a piston 108 arranged for sliding engagement within a bushing 109. As best shown in Fig. 5, the toothed segment 101 of the rack member 102 is in mesh with the teeth of the intermittent gear 92 when the rack and pistons are at the upper limit of their movement. During downward movement of the piston unit, the intermittent gear 92 will be rotated to a predetermind position in which a dwell surface 111 on the gear engages a smooth portion of the rack 102, so that the intermittent gear and clutch member 74 will always be rotated to the same predetermined position which is maintained during the continued downward movement of the piston unit including rack 102 and pistons 104, 108.

Figure 6:
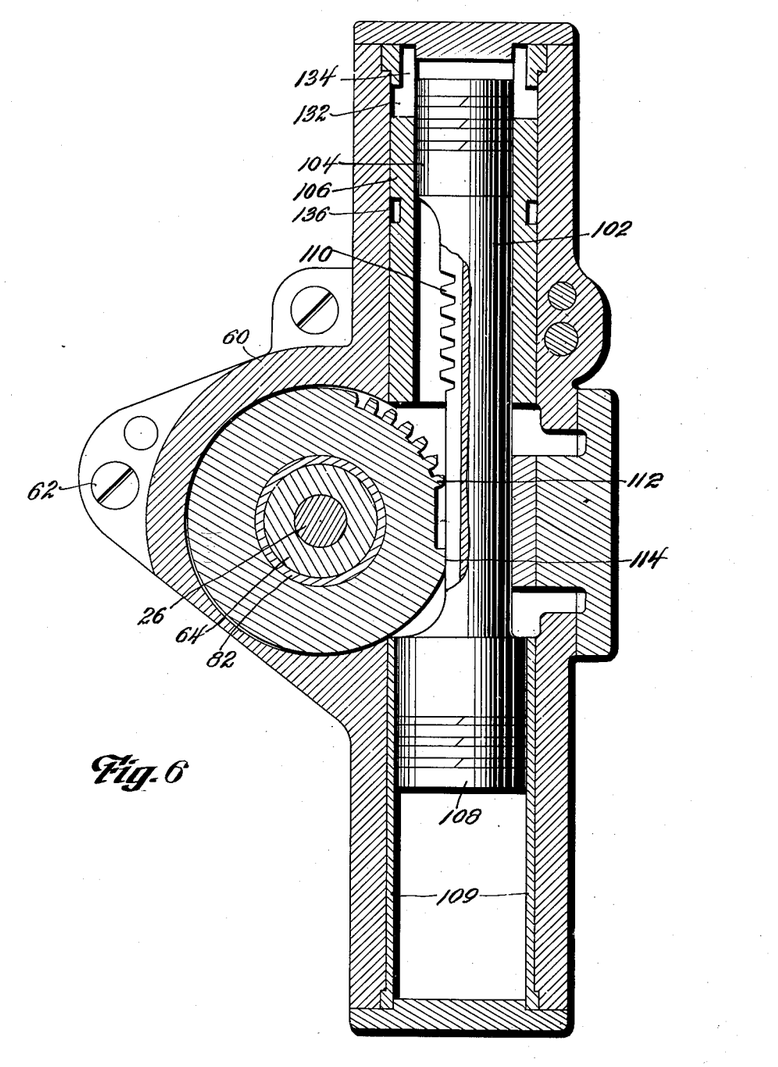
Fig. 6 is a sectional view in left side elevation taken on the line 6—6 of Fig. 4, illustrating particularly the piston-actuated rack and the clamp actuating intermittent gear associated therewith.

After the intermittent gear 92 has reached its advanced position, the continued downward movement of the piston unit including pistons 104, 108 and associated racks, is then operative to engage the spindle clamp. The mechanism for applying the clamp consists of a second toothed segment 110 formed integrally with the spindle advancing and retracting rack member 102 and an intermittent gear 112 carried on the sleeve hub 84. As best shown in Figs. 4 and 6, the intermittent gear 112 is provided with a dwell surface 114 which is arranged when the pistons 104 and 108 are in their raised position for engagement with a smooth portion of the rack 102 as shown in Fig. 6. With the arrangement shown, the intermittent gear 112 is maintained in a stationary position during the first portion of the downward movement of the pistons 104, 108 and associated racks. Rotational movement of the gear 112 is rendered operative to control the operation of the spindle clamp through connections which, as best shown in Figs. 4 and 7, consist of a second gear 116 on the sleeve hub 84 which meshes with rack teeth formed in an axially shiftable connecting bar 118, and the bar 118 is formed with rack teeth which mesh with the gear segment 96 formed on the screw-threaded clamp tightening sleeve member 58. The construction and arrangement of the parts is such as to cause the downward movement of the pistons 104, 108 to be arrested by the tightening action of the clamp and before the pistons reach the limit of their downward movement.

Figure 2:
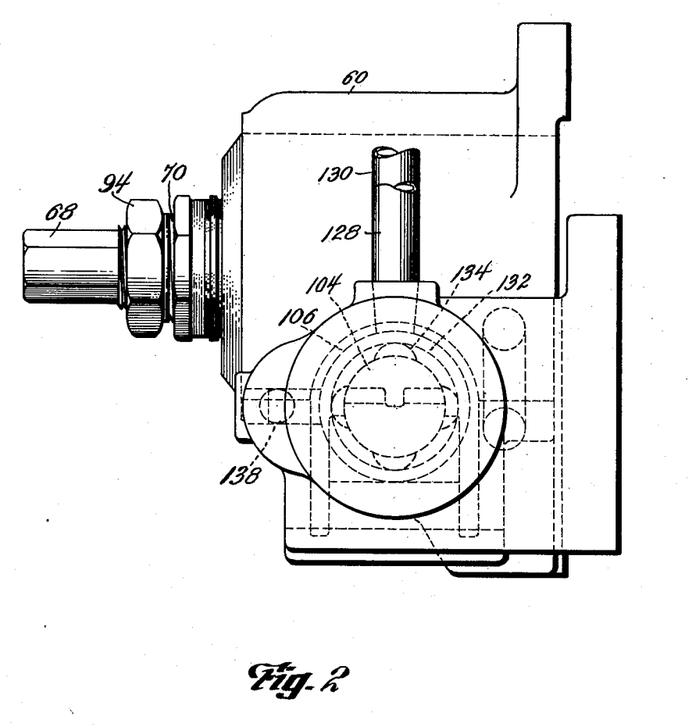
Fig. 2 is an enlarged plan view of the housing for my spindle retracting attachment.

In the illustrated form of the invention, the pistons 104, 108 are arranged to be operated by means of compressed air which is supplied through a compressed air supply line 122 to an air control valve 126 mounted at the rear side of the spindle head casing, and thence through one or the other of two conduits 128, 130 to the housing 60. As best shown in Figs. 2, 3 and 7, air is admitted through the conduit 128 and annular port 132 in the upper piston bushing 106 through port openings 134 to the upper face of piston 104. Compressed air from conduit 130 is admitted through an annular port 136 formed in the outer periphery of the upper piston supporting sleeve bushing 106 to a downwardly extending conduit 138 (see Fig. 3) through a port opening 140 to the lower face of piston 108.

Figure 8:
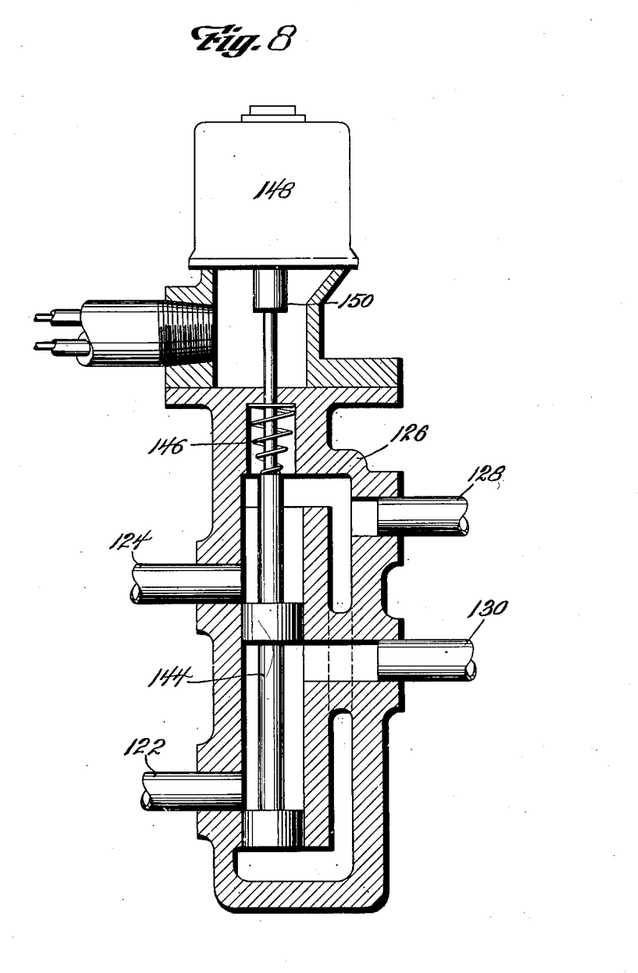
Fig. 8 is an enlarged sectional view of the piston reversing air-control valve.

The air valve 126 which may be of ordinary description as shown in Fig. 8, is formed with a valve piston 144 which is arranged for movement between two alternative positions. For the low position of the piston 144 shown, air under pressure is directed from the supply line 122 through conduit 130 to the face of the lower piston 108, while the conduit 128 to the face of the upper piston 104 is connected to the exhaust line 124. In the alternative position of the air valve in which the valve piston is at the upper end of its movement, it will be evident that the pressure line 122 will be connected through conduit 128 to the face of the upper piston 104, and that the conduit 130 to the face of the lower piston 108 will then be connected to the exhaust line 124. A spring 146 acts to maintain the air valve piston 144 normally in its low position which corresponds with the raised position of pistons 104, 108 and associated racks, as shown in Figs. 5, 6 and 7 of the drawings, and in which the milling cutter spindle has been unclamped and moved to its retracted position. In the embodiment of the invention shown, the air valve 126 is adapted to be operated by means of a solenoid 148 generally indicated in Fig. 8. When the solenoid is energized, the armature 150 to which the air valve piston 144 is connected, will be drawn upwardly, thus initiating the downward movement of pistons 104, 108 to advance the milling cutter spindle sleeve to its operative position, and thereafter to engage the spindle sleeve clamp. When the solenoid is again de-energized, the piston 144 is again moved downwardly under the influence of spring 146 to the position shown in Fig. 8, so that fluid pressure is exhausted from the upper chamber of the piston unit through conduit 128 (see Figs. 7 and 8) and exhaust conduit 124. At the same time compressed air is admitted from the supply line 122 through conduit 130 (see Figs. 3 and 8) to the chamber at the lower end of the piston unit to move the piston unit upwardly to the position illustrated in the several drawings. This upward movement of the piston unit including pistons 104 and 108 and connecting stem 102 first causes the intermittent gear 112 meshing with rack 110 to be rotated in a counterclockwise direction to the dwell position shown in Fig. 6. Rotation of the companion gear segment 116 moves the rack 118 (see Fig. 7) upwardly, thus rocking the gear segment 96 and the associated sleeve nut 58 of the clamping unit to its inoperative position. Continued upward movement of the piston unit after the clamp is released, then causes the teeth of intermittent gear 92 to be engaged with rack teeth 101 of the rack member or stem 102 to rotate the clutch member 74 and shaft extension 64 associated therewith counterclockwise to the position shown in Fig. 5, thus causing shaft 26 shown in Figs. 3 and 4, to be rotated in a direction to move the spindle casing to its retracted position.

Further in accordance with the invention, the attachment for unclamping and for retracting the milling cutter spindle axially from its operative position, and alternatively for advancing and thereafter clamping the spindle sleeve with the spindle in its operating position, is connected into the electrical control system of the machine to function in an automatic table feed and rapid traverse return cycle of operation for the performance of a face milling operation to cause the face mill to be moved to its operative position prior to the beginning of the feed cut, and to be moved to its retracted position out of engagement with the work prior to the start of the return rapid traverse movement of the table.

For controlling the axial shift between operative and inoperative positions, and clamping and unclamping of the milling cutter spindle sleeve in accordance with the automatic cycle referred to, an electrical control system is employed which is similar in many respects to that shown in the patent to Bennett et al. No. 2,068,848 above referred to, but with such modifications and improvements as required to control additionally the operation of the compressed air valve solenoid 148. The construction and operation of the electrical controls for the machine will be described so far as necessary to illustrate the connection of the present invention therewith, with reference to the diagrammatic Fig. 9 of the drawings. In this figure the table driving motor for the machine is designated at 154, the spindle driving motor at 156, and a pump motor at 158. Power is supplied to the several motors from a main three phase power line designated at L1, L2 and L3. The table motor 154 is connected to be driven alternatively in reverse directions through table motor directional starting relay switches L and R, and is further arranged to be driven at alternative high and low speeds through switch connections generally indicated by a block entitled High and Low Speed Sw. For driving the table alternatively at a feed and quick traverse rate, feed and quick traverse gear connections are provided including a clutch (not here shown) which is controlled by a feed quick traverse solenoid indicated at 160 and a feed-quick traverse relay switch RC. Operation of the main directional starting relay switches L and R, the feed-quick traverse relay switch RC and the newly added air valve solenoid 148 is controlled by means of electrical control circuits which include therein secondary table feed relay control switches RR and LR, and secondary table quick traverse relay control switches TL and TR together with certain other operating switches which will not be specifically referred to as having no connection with the present invention. Manual and table dog actuated switches provided in the electrical circuits for controlling the operation of the machine include a table Feed Left switch contactor 9—7, a Feed Right contactor 14—12, a Fast Left contactor 9—10 and a Fast Right contactor 14—15. Power is supplied to the electrical control circuit through a transformer, so labelled in Fig. 9, the primary of which is connected across lines L1 and L2 of the main power line.

Figure 9:
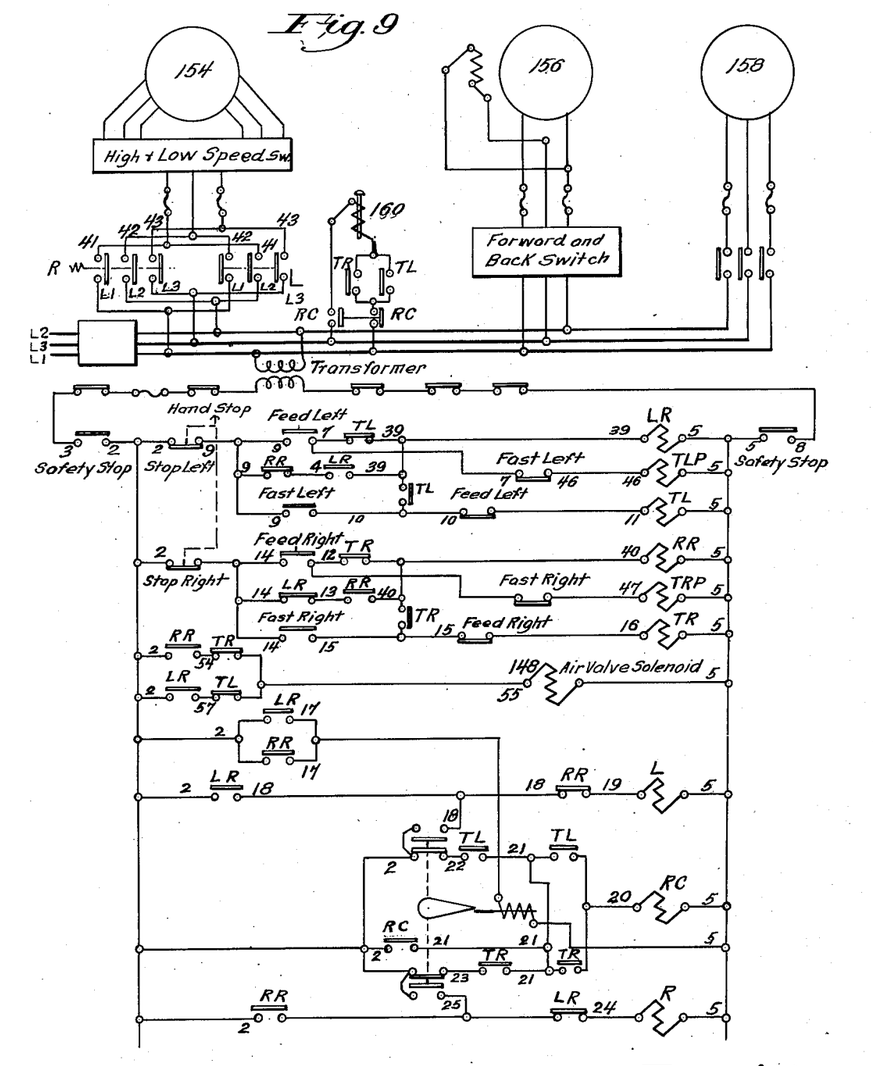
Fig. 9 is a diagrammatic view of a portion of the electrical control system for the machine.
Figure 10:
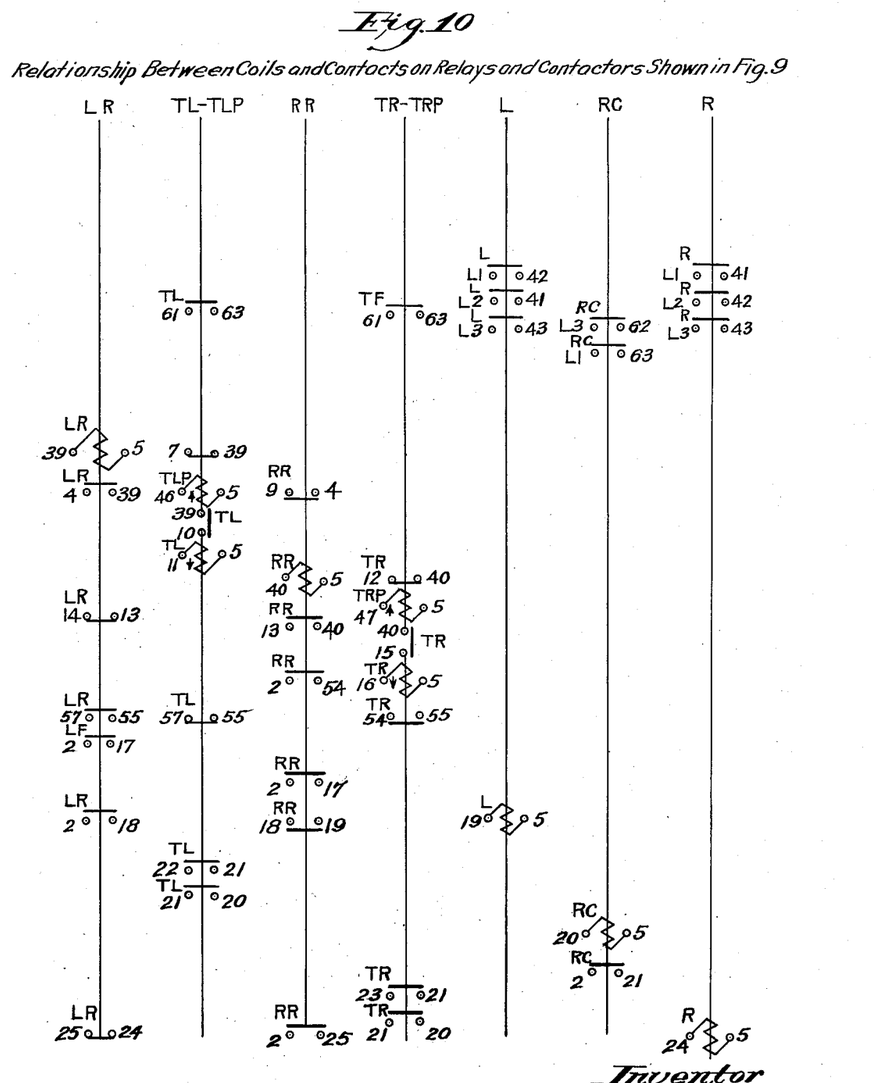
Fig. 10 is a diagrammatic view providing a key for the switch connections shown in Fig. 9.

The operation of the machine including the electrical controls above referred to, for the performance of a face milling operation in accordance with a feed and fast traverse return automatic cycle in which the milling cutter is automatically advanced and clamped in position prior to the start of the milling cut, and is thereafter unclamped and retracted prior to the rapid traverse return, will be briefly described as follows:

It is assumed that a work piece has been set up toward the right end of the work table, and that the machine is in condition to start so that Safety Stop contactors 3—2 and 5—8 are closed. To start the operation, the operator presses the Feed Left contactor 9—7, thus energizing the secondary feed left relay LR, causing the several LR contactors to shift. Thus, LR contactor 4—39 closes, forming a holding circuit for relay LR. LR contactor 2—17 closes, energizing main table motor relay switch L, so that L contactors L1—42, L2—41 and L3—43 close, starting the table motor 154 in a direction to cause the table to feed left. At the same time LR contactor 2—57 closes, energizing Air Valve Solenoid 148, which raises air valve piston 144, connecting air conduit 128 to the air pressure line 122 and conduit 130 to exhaust line 124. Piston unit 104, 108 moves downward, causing the spindle sleeve to be advanced to and clamped in operative position. It will be noted also that LR contactor 25—24 opens.

Upon completion of the face milling cut, a table dog may operate to close the Fast Right contactor 14—15, causing the electrical control circuits to be conditioned so that the milling cutter spindle is unclamped and retracted to its inoperative position, and the table is returned at a rapid traverse rate to its starting position to the right. Secondary Fast Traverse relay switch TR is energized, causing all TR contactors to be shifted. Thus TR contactor 40—15 closes, forming a holding circuit for relay TR, and energizing the secondary Feed Right relay switch RR. TR contactor 12—40 opens. TR contactors 23—21 and 21—20 close, so that fast traverse solenoid control relay switch RC will be energized subject to the operation of the Table Viscosity Switch in the manner set forth in the Bennett et al. patent referred to. Contactor TR 54—55 in the air valve solenoid circuit opens. When secondary relay switch RR is energized as above noted, the several RR contactors are shifted. Thus, RR contactor 9—4 opens, causing secondary relay LR to be de-energized, causing the several LR contactors to move to the open position. Contactor RR is opened, de-energizing main table relay switch L which opens. Contactor RR 2—17 closes to maintain the Viscosity Switch solenoid 17—5 energized. Contactor RR 13—40 closes, forming a holding circuit with closed contactor LR 14—13 for secondary relay switch RR. Contactor RR 2—25 closes, so that as contactor LR 25—24 opens, main table motor relay switch R is energized, causing the motor to be rotated in a direction to move the table to the right. Since relay RC is energized, this movement will be at the quick traverse rate.

The operation of the several secondary relay switches to start the return movement of the table at the fast traverse rate, including specifically the energizing of fast traverse secondary relay TR which causes contactor TR 55—54 to open, and the de-energizing of the Feed Left secondary relay LR which causes contactor LR 2—57 to open, causes the air valve solenoid 148 to be de-energized and the air valve piston 144 to be depressed, so that the milling cutter spindle is unclamped and moved to its retracted position in this manner. Downward movement of air valve piston 144 connects air conduit 128 to the exhaust line 124 and air conduit 130 to the air pressure line 122, so that piston unit 104, 108 is moved upward to effect the unclamping and retracting of the milling cutter spindle from its operative position.

It will be understood that the invention is not limited to the specific embodiment shown, and that various deviations may be made therefrom without departing from the spirit and scope of the appended claims.

What is claimed is:

1. In a milling machine having a rotary milling cutter spindle, a spindle support, and a milling cutter spindle sleeve within which the spindle is rotatably mounted axially shiftable on said support between operative and retracted positions, a spindle sleeve shifting device, a spindle sleeve clamping device, power means, a driving member actuated thereby, connections between said member and shifting device responsive to movement of said driving member for actuating said spindle sleeve shifting device and arranged for movement to a predetermined position in which the spindle sleeve is shifted to operative position, connections between said member and clamping device responsive to movement of said driving member for actuating said sleeve clamping device including a lost motion connection operative to effect the clamping of the spindle only after the spindle has been moved to the operative position.

2. In a milling machine, the combination with a work support and a tool support adapted for relative translatory movement, a tool spindle assembly including a rotary spindle adapted to receive a face mill, a supporting sleeve for the spindle axially shiftable on the tool support, a spindle sleeve shifting device, a clamping device for clamping the sleeve against axial movement on the tool support, and an attachment for moving the spindle between operating and inoperative positions, which comprises a driving member arranged to be shifted alternatively in opposite directions, and connections between said member and each of said shifting device and said clamping device rendered operative by movement of said member in one direction to advance and thereafter to clamp the spindle in a predetermined operative position, and by movement of said member in the opposite direction to unclamp and thereafter to move the spindle axially to an inoperative position.

3. In a milling machine, the combination with a work support and a tool support adapted for relative translatory movement, a tool spindle assembly including a rotary spindle adapted to receive a face mill, a supporting sleeve for the spindle axially shiftable on the tool support, a spindle sleeve shifting device, a clamping device for clamping the sleeve against axial movement on the tool support, and an attachment for moving the spindle between operating and inoperative positions, which comprises a fluid pressure operated piston unit, a fluid pressure control element shiftable to effect movement of the piston unit alternately in opposite directions, and connections between the piston unit and each of the shifting device and clamping device rendered operative by the movement of said piston unit in one direction to advance and thereafter to clamp the spindle in a predetermined operative position, and by movement of said piston unit in the opposite direction to unclamp and thereafter to move the spindle axially to an inoperative position.

4. In a milling machine, the combination with a work support and a tool support adapted for relative translatory movement, a tool spindle assembly including a rotary spindle adapted to receive a face mill, a supporting sleeve for the spindle axially shiftable on the tool support, a spindle sleeve shifting device, a clamping device for clamping the sleeve against axial movement on the tool support, and an attachment for moving the spindle between operating and inoperative positions, which comprises a driving member arranged to be shifted alternatively in opposite directions, connections between the driving member and shifting device rendered operative by movement of said driving member in one direction for actuating said sleeve shifting device to advance the sleeve to a predetermined position, and connections between the driving member and the clamping device rendered operative by a continued movement of the driving member in the same direction to thereafter actuate said clamping device to clamp the spindle, said connections being further arranged upon movement of the driving member in the opposite direction in the reverse order to unclamp and to retract the spindle.

5. In a milling machine having a work support and a tool support adapted for relative translatory movement, a rotary milling cutter spindle and an axially adjustable supporting sleeve for the spindle, the combination of a spindle shift mechanism for effecting axial movement of the spindle sleeve and spindle supported thereby between operating and retracted positions, a spindle sleeve clamping device, and a spindle control device comprising a fluid operated piston unit, a fluid pressure control element shiftable to effect movement of the piston unit alternately in opposite directions, intermittent gear and rack connections between the piston unit and each of the spindle shift mechanism and clamping device operative upon movement of the piston unit in one direction to advance the spindle sleeve axially and thereafter to clamp the sleeve, and operative upon movement of the piston unit in the opposite direction to unclamp the sleeve and thereafter to retract the spindle.

6. For use in a milling machine having a milling cutter spindle, an axially adjustable sleeve support for the cutter spindle, a spindle sleeve axial shift device including a rotatable sleeve shifting element, and a clamping device for the spindle sleeve including a rotatable clamping element, an attachment for moving the spindle between operating and inoperative positions, which comprises a housing, a fluid operated piston unit, a fluid control valve shiftable to move the piston unit alternately in reverse directions, a piston actuated rack, and an intermittent gear actuated by said rack to rotate the spindle sleeve axial shift element, a second piston actuated rack, and a second intermittent gear actuated by said latter mentioned rack for rotating the clamping element, said racks and intermittent gears being disposed with relation to one another for one direction of movement of the racks first to advance the spindle sleeve and thereafter to clamp the spindle sleeve, and for the opposite direction of movement of the racks first to unclamp the sleeve and thereafter to retract the sleeve.

7. For use in a milling machine having a milling cutter spindle, an axially adjustable sleeve support for the cutter spindle, a spindle sleeve axial shift device including a rotatable sleeve shifting element, a clamping device for the spindle sleeve including a rotatable clamping element, an attachment for moving the spindle between operating and inoperative positions, which comprises a housing, a fluid pressure operated piston unit, fluid pressure supply and exhaust connections and a fluid pressure control valve shiftable to move the piston unit alternately in reverse directions, a pair of piston actuated racks, a sleeve shifting intermittent gear associated with one of said racks and connected to turn said spindle sleeve shifting element, a clamp actuating intermittent gear associated with the other of said racks and supported coaxially with said sleeve shifting intermittent gear, and a connection from said second intermittent gear for rotating said spindle sleeve clamping element, said racks and intermittent gears being so disposed and arranged that movement of the piston unit and racks in one direction is effective to rotate the first-mentioned intermittent gear from one to another predetermined angular position, and thereafter to rotate the second-mentioned intermittent gear to apply the clamp, movement of the rack in the alternate direction being effective to rotate said intermittent gears in the reverse order to their respective starting positions.

8. For use in a milling machine having a milling cutter spindle, an axially adjustable sleeve support for the cutter spindle, a spindle sleeve axial shift device including a rotatable sleeve shifting element, a clamping device for the spindle sleeve including a rotatable clamp actuating element, an attachment for moving the spindle between operating and inoperative positions, which comprises a housing, a fluid operated piston unit, a control valve shiftable to move the piston unit alternately in reverse directions, a pair of piston actuated racks, a sleeve shifting intermittent gear associated with one of said racks supported coaxially with said rotatable spindle sleeve shifting element, a clutch connecting said intermittent gear with said sleeve shifting element, a manually operated element connected for rotating said sleeve shifting element, a clamp actuating intermittent gear associated with the other of said racks and supported coaxially with the sleeve shift intermittent gear, a rack and pinion connection between said second intermittent gear and said rotatable clamp actuating element, said piston actuated racks and intermittent gears being so disposed and arranged that movement of the racks in one direction is effective first to rotate the sleeve shifting intermittent gear from one to another limiting position, and thereafter to rotate the clamp actuating intermittent gear to clamp the sleeve, movement of the piston actuated racks in the reverse direction being effective to return the respective intermittent gears in the reverse order to their respective starting positions.

9. For use in a milling machine having a milling cutter spindle, an axially adjustable sleeve support for the cutter spindle, a spindle sleeve axial shift device including a rotatable sleeve shifting element, and a clamping device for the spindle sleeve including a rotatable clamp actuating element, an attachment for moving the spindle between operating and inoperative positions, which comprises a pair of lengthwise shiftable racks and power actuated means for shifting said racks alternately in opposite directions, a spindle sleeve shifting intermittent gear meshing with one of said racks, a clamp actuating intermittent gear meshing with the other of said racks, a clutch connecting said sleeve shifting intermittent gear with said sleeve shifting element, a manual control element operable to effect angular adjustment of said shifting element with relation to the connecting intermittent gear, and a rack and pinion connection connecting the clamp actuating intermittent gear with the clamp actuating element, said pair of racks and intermittent gears being constructed and arranged so that movement of the racks in one direction is effective first to move the sleeve shifting intermittent gear from one to another predetermined position to advance the spindle sleeve, and thereafter to rotate the clamp actuating intermittent gear to engage the clamp, and movement of said racks in the opposite direction is effective to return the respective intermittent gears in the reverse order to their respective starting positions.

10. For use in a milling machine having a milling cutter spindle, an axially adjustable sleeve support for the cutter spindle, a spindle sleeve axial shift device including a rotatable sleeve shifting element, and a clamping device for the spindle sleeve including a rotatable clamp actuating element, an attachment for moving the spindle between operative and inoperative positions, which comprises a longitudinally movable rack unit, a spindle sleeve shift intermittent gear associated with said rack unit connected to rotate said sleeve shifting element, a clamp actuating intermittent gear associated with said rack unit connected to rotate said clamp actuating element, said rack unit and intermittent gears being constructed and arranged so that movement of the rack unit in one direction is effective first to rotate the sleeve shifting intermittent gear to a predetermined dwell position to advance the spindle sleeve, and thereafter to rotate the clamping intermittent gear from a retracted dwell position to apply the clamp, and yieldably acting means for effecting said movement of the rack unit.

11. In a milling machine having a work support and a tool support adapted for relative translatory movement, a rotary milling cutter spindle, and an axially adjustable supporting sleeve for the spindle, a spindle sleeve axial shift device including a rotatable sleeve shifting element, a clamping device for the sleeve including a rotatable clamp actuating element, and an attachment for moving the spindle between operating and in operative positions, which comprises an actuating member, power operated means for moving said actuating member between alternative limiting positions, an intermittent motion connection between said member and the shift device operative during a first portion of the movement of the member in one direction to rotate said sleeve shift element to a predetermined angular position to advance the sleeve, and a second intermittent motion connection between said member and the clamping device operative during the latter portion of said movement of said member to rotate said clamp actuating element to set the clamp, said connections being operative during the movement of said member in the reverse direction to return said axial shift and clamp actuating elements to their starting positions in the reverse order.

12. For use in a milling machine having a milling cutter spindle, a spindle support for the cutter spindle axially adjustable on the support, a spindle sleeve axial shift device including a rotatable sleeve shifting element, and a clamping device for the spindle sleeve including a rotatable clamp actuating element, an attachment for moving the spindle between operating and inoperative positions, which comprises a housing, a shaft extension from the sleeve shifting element, a sleeve shift intermittent gear secured to the shaft extension, a clamping intermittent gear loose on the shaft extension, gear and rack connections connecting the clamping intermittent gear with the rotatable clamp actuating element, a pair of pistons and a pair of intermittent racks connecting said pistons disposed upon movement of the pistons in one direction first to rotate said spindle shift intermittent gear to a dwell position to advance the spindle, and thereafter to rotate said clamping intermittent gear from a dwell position to set the clamp and upon movement of the pistons in the reverse direction to unclamp and thereafter to retract the spindle, and a fluid pressure control device operable to apply fluid pressure to move said pistons alternatively in reverse directions.

13. In a milling machine having a rotary milling cutter spindle, a spindle support and a sleeve within which the spindle is rotatably mounted axially adjustable on said support between operative and retracted positions, a spindle sleeve shifting device, power operated connections including a driving element movable to a predetermined position, a releasable clutch connection between said driving element and shifting device whereby said movement of the driving element effects a movement of the spindle sleeve and spindle to a correspondingly advanced operating position, and means under the control of the operator for adjusting said releasable clutch connection between the shifting device and the driving element to adjust the operating position of the spindle sleeve and spindle.

14. In a milling machine having a rotary milling cutter spindle, a spindle support and a milling cutter spindle sleeve within which the spindle is rotatably mounted axially adjustable on said support between operative and retracted positions, a spindle sleeve axial shift device including a rotatable sleeve shifting element, a driving element rotatable to a predetermined angular position for moving the spindle sleeve and spindle to a correspondingly advanced operative position, and a releasable clutch connection between the driving element and spindle shifting element releasable to permit manual adjustment of the angular relation of the shifting element and the driving element for adjustment of the advanced operating position of the spindle sleeve and spindle.

15. In a milling machine having a rotary milling cutter spindle, a spindle support and a milling cutter spindle supporting sleeve axially adjustable on said support for shifting the milling cutter spindle between operative and retracted positions, a spindle sleeve axial shift device including a rotatable sleeve shifting element, power operated connections for rotating said sleeve shifting element comprising a longitudinally movable rack including a dwell surface, an intermittent gear having a cooperating dwell surface and arranged to be rotated by movement of the rack in one direction to a predetermined angular position in which said dwell surfaces are engaged, a clutch connection between the gear and sleeve shifting element whereby said rotational movement of the intermittent gear to said predetermined angular position is effective to advance the spindle sleeve and spindle supported therein to a correspondingly advanced operative position, and means under the control of the operator to adjust the angular relation between said intermittent gear and sleeve shifting element, and thereby to adjust the operative position of the spindle sleeve and spindle mounted therein.

16. In a milling machine, the combination with a work support and a tool support adapted for relative translatory movement, a tool spindle assembly including a rotary spindle adapted to receive a face mill, a supporting sleeve for the spindle axially shiftable on the tool support, a spindle sleeve shifting device, a clamping device for clamping the sleeve against axial movement on the tool support, and an attachment for moving the spindle between operating and inoperative positions, which comprises a fluid pressure operated piston unit, a fluid pressure control valve for directing said fluid pressure to effect movement of the piston unit alternately in opposite directions, electrical control means for the valve including a solenoid, and connections rendered operative by the movement of said piston unit in one direction to advance and thereafter to clamp the spindle in a predetermined operative position, and by movement of said piston unit in the opposite direction to unclamp and thereafter to move the spindle axially to an inoperative position.

17. In a milling machine, the combination with a work support and a tool support adapted for relative translatory movement at alternative feed and rapid traverse rates, a tool spindle assembly including a rotary spindle adapted to receive a face mill, a supporting sleeve for the spindle axially shiftable on the tool support, a spindle sleeve shifting device, a clamping device for clamping the sleeve against axial movement on the tool support, an attachment for moving the spindle between operating and inoperative positions, which comprises a driving element arranged to be shifted alternately in opposite directions, connections rendered operative by movement of said element in one direction to advance and thereafter to clamp the spindle in a predetermined operative position, and by movement of said element in the opposite direction to unclamp and thereafter to move the spindle axially to an inoperative position, and an electrical control mechanism for operating the machine in accordance with an automatic feed and rapid return face milling operation including electrically operated means for shifting said driving element in a direction to advance and clamp the spindle in operative position during relative translatory movement at the feed rate, and for shifting said driving element in the opposite direction to unclamp and to retract the spindle during relative translatory movement at the fast traverse rate.

18. In a milling machine having a work table longitudinally movable at alternative feed and quick traverse rates, a rotary milling cutter spindle adapted to support an end mill, a spindle support, and a sleeve within which the spindle is rotatably mounted axially shiftable on said support between operative and retracted positions, the combination of a spindle sleeve shifting device, a spindle sleeve clamping device, operating means for said devices operable to advance and to clamp the sleeve and alternatively to unclamp and retract the sleeve, and a control mechanism for operating the machine in accordance with an automatic feed and rapid traverse return face milling operation, which comprises control devices acting automatically when rendered operative to impart a feed movement to the table in one direction, and thereafter a rapid traverse movement in the opposite direction to starting position, said control devices including connections acting on said operating means for said sleeve shifting and clamping devices to advance and clamp the sleeve in operating position when the table is started at a feed rate, and to unclamp and to retract the sleeve upon starting of said return fast traverse movement of the table.

19. In a milling machine having a work table longitudinally movable at alternative feed and quick traverse rates, a rotary milling cutter spindle adapted to support an end mill, a spindle support, and a sleeve within which the spindle is rotatably mounted axially shiftable on said support between operative and retracted positions, the combination of a spindle sleeve shifting device, a spindle sleeve clamping device, and operating means operable to advance and to clamp the sleeve and alternatively to unclamp and retract the sleeve, and an electrical control system for operating the machine in accordance with an automatic feed and rapid traverse return face milling operation, which comprises electrically operated connections acting automatically when rendered operative to impart a feed movement to the table in one direction, and thereafter a rapid traverse movement in the opposite direction to starting position, a control element for said operating means shiftable in one direction to cause said operating means to advance and to clamp the sleeve and in the opposite direction to cause said operating means to unclamp and to retract the sleeve, a solenoid operable to effect movement of the control element between said alternative positions, and connections from said electrical controls acting on said solenoid to advance and to clamp the sleeve upon the start of said feed movement, and to unclamp and to retract the sleeve upon the start of said fast traverse return movement of the table.

20. In a milling machine having a work table longitudinally movable at alternative feed and quick traverse rates, a rotary milling cutter spindle adapted to support an end mill, a spindle support, and a sleeve within which the spindle is rotatably mounted axially shiftable on said support, between operative and retracted positions, the combination of a spindle sleeve shifting device, a spindle sleeve clamping device, operating means including a solenoid operable to advance and to clamp the sleeve and alternatively to unclamp and retract the sleeve, and an electrical control system for the machine comprising table directional feed and quick traverse operating switches, a spindle sleeve axial shift and clamp solenoid operating switch, operating switch contactors and table directional feed and quick traverse secondary switches controlled thereby for operating said table directional feed and quick traverse operating switches, and including secondary switch contactors operable by said secondary table directional feed switches to advance and to clamp the spindle in operating position, and secondary switch contactors operable by said secondary table directional quick traverse switches to unclamp and to retract the spindle sleeve to inoperative position.

EDWARD E. COFFIN.

REFERENCES CITED

The following references are of record in the file of this patent:

UNITED STATES PATENTS

| Number | Name | Date |
|---|---|---|
| 2,178,130 | Zwick | Oct. 31, 1939 |
| 2,224,108 | Ridgway | Dec. 3, 1940 |
| 2,242,445 | Armitage | May 20, 1941 |
| 2,356,796 | Purvin | Aug. 29, 1944 |
| 2,437,829 | Mason | Mar. 16, 1948 |
| 2,445,433 | Holmstrom | July 20, 1948 |